(12) United States Patent
Venkatachalam et al.

(10) Patent No.: US 7,987,512 B2
(45) Date of Patent: Jul. 26, 2011

(54) BIOS BASED SECURE EXECUTION ENVIRONMENT

(75) Inventors: Raja Venkatachalam, Redmond, WA (US); Ricardo Lopez-Barquilla, Redmond, WA (US); Zhangwei Xu, Redmond, WA (US); Curt A. Steeb, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1102 days.

(21) Appl. No.: 11/419,402

(22) Filed: May 19, 2006

(65) Prior Publication Data
US 2007/0271597 A1    Nov. 22, 2007

(51) Int. Cl.
G06F 21/00    (2006.01)
(52) U.S. Cl. .................. 726/27; 726/26; 726/34; 713/2; 713/194
(58) Field of Classification Search .............. 713/2, 194; 726/26, 27, 34
See application file for complete search history.

(56) References Cited

U.S. PATENT DOCUMENTS

| | | | | |
|---|---|---|---|---|
| 4,549,168 | A * | 10/1985 | Sieradzki ....................... | 340/525 |
| 5,481,463 | A * | 1/1996 | Constant et al. .............. | 705/400 |
| 5,634,058 | A | 5/1997 | Allen et al. | |
| 5,826,090 | A | 10/1998 | Mealey et al. | |
| 6,233,685 | B1 * | 5/2001 | Smith et al. .................... | 713/194 |
| 6,243,692 | B1 | 6/2001 | Floyd et al. | |
| 6,272,636 | B1 * | 8/2001 | Neville et al. ................. | 713/189 |
| 6,327,652 | B1 | 12/2001 | England et al. | |
| 6,357,007 | B1 * | 3/2002 | Cromer et al. ................ | 713/194 |
| 6,363,436 | B1 | 3/2002 | Hagy et al. | |
| 6,449,110 | B1 | 9/2002 | DeGroat et al. | |
| 6,499,110 | B1 | 12/2002 | Moses et al. | |
| 6,618,810 | B1 * | 9/2003 | Dirie ............................... | 726/27 |
| 6,810,438 | B1 | 10/2004 | Chrysanthakopoulos | |
| 6,947,723 | B1 * | 9/2005 | Gurnani et al. ............... | 455/406 |
| 6,985,946 | B1 | 1/2006 | Vasandani et al. | |
| 7,024,696 | B1 | 4/2006 | Bahar | |
| 7,069,330 | B1 | 6/2006 | McArdle et al. | |
| 7,085,928 | B1 | 8/2006 | Schmid et al. | |
| 7,146,496 | B2 * | 12/2006 | Circenis et al. ............... | 713/100 |
| 7,171,686 | B1 * | 1/2007 | Jansen et al. .................... | 726/17 |
| 7,228,545 | B2 * | 6/2007 | Circenis et al. ............... | 718/102 |
| 7,281,008 | B1 | 10/2007 | Lawrence et al. | |
| 7,334,124 | B2 | 2/2008 | Pham et al. | |
| 7,373,497 | B2 * | 5/2008 | Circenis et al. ............... | 713/100 |
| 7,392,541 | B2 | 6/2008 | Largman et al. | |

(Continued)

FOREIGN PATENT DOCUMENTS

EP    796023 A2 *    9/1997

(Continued)

OTHER PUBLICATIONS

J. Zhang, R. Lumia, J. Wood, G. Starr; "Achieving Deterministic, Hard Real-time Control On An IBM—Compatible PC: A General Configuration Guideline"; Department of Mechanical Engineering, University of New Mexico; 2005; pp. 1-7.*

(Continued)

*Primary Examiner* — Carl Colin
(74) *Attorney, Agent, or Firm* — Lee & Hayes, PLLC (57) ABSTRACT

Techniques to provide a secure execution environment are described. In an implementation, a method includes initiating a hardware interrupt by an embedded controller of a computing device. In response to the interrupt, a module is executed that is stored in a basic input/output system (BIOS). The module, when executed, determines whether constrain functionality of the computing device based on a balance.

15 Claims, 5 Drawing Sheets

U.S. PATENT DOCUMENTS

| | | | |
|---|---|---|---|
| 7,500,093 B2 * | 3/2009 | Makita | 713/2 |
| 7,571,143 B2 * | 8/2009 | Circenis et al. | 705/400 |
| 7,590,837 B2 * | 9/2009 | Bhansali et al. | 713/2 |
| 2001/0034762 A1 | 10/2001 | Jacobs et al. | |
| 2002/0042882 A1 * | 4/2002 | Dervan et al. | 713/200 |
| 2002/0147633 A1 | 10/2002 | Rafizadeh | |
| 2003/0084380 A1 * | 5/2003 | Piazza et al. | 714/47 |
| 2003/0135380 A1 * | 7/2003 | Lehr et al. | 705/1 |
| 2003/0212893 A1 | 11/2003 | Hind et al. | |
| 2004/0008582 A1 * | 1/2004 | Richards et al. | 368/10 |
| 2004/0073516 A1 * | 4/2004 | Yamamichi et al. | 705/57 |
| 2004/0193875 A1 | 9/2004 | Aura | |
| 2004/0255149 A1 * | 12/2004 | Toyama et al. | 713/200 |
| 2005/0037732 A1 * | 2/2005 | Kotzin | 455/411 |
| 2005/0044191 A1 * | 2/2005 | Kamada et al. | 709/223 |
| 2005/0044203 A1 * | 2/2005 | Kokubun et al. | 709/223 |
| 2005/0055588 A1 | 3/2005 | Nalawadi et al. | |
| 2005/0144608 A1 | 6/2005 | Oyama et al. | |
| 2005/0160035 A1 * | 7/2005 | Umamyo | 705/39 |
| 2005/0160281 A1 | 7/2005 | Thibadeau | |
| 2005/0166208 A1 | 7/2005 | Worley et al. | |
| 2005/0172017 A1 | 8/2005 | Dawson | |
| 2005/0183143 A1 * | 8/2005 | Anderholm et al. | 726/22 |
| 2005/0203835 A1 * | 9/2005 | Nhaissi et al. | 705/39 |
| 2005/0223243 A1 | 10/2005 | Moore et al. | |
| 2005/0240985 A1 | 10/2005 | Alkove et al. | |
| 2005/0268058 A1 * | 12/2005 | Drasnin et al. | 711/163 |
| 2005/0283821 A1 * | 12/2005 | Fox et al. | 726/1 |
| 2006/0015566 A1 | 1/2006 | Sampson | |
| 2006/0080648 A1 | 4/2006 | Anwar et al. | |
| 2006/0101047 A1 * | 5/2006 | Rice | 707/101 |
| 2006/0128305 A1 | 6/2006 | Delalat | |
| 2006/0149871 A1 * | 7/2006 | Marshall et al. | 710/72 |
| 2006/0174229 A1 | 8/2006 | Muser | |
| 2006/0224689 A1 | 10/2006 | Leip et al. | |
| 2006/0236084 A1 * | 10/2006 | Wu et al. | 713/2 |
| 2006/0253704 A1 | 11/2006 | Kempf et al. | |
| 2007/0033531 A1 | 2/2007 | Marsh | |
| 2007/0143159 A1 | 6/2007 | Dillard et al. | |
| 2007/0180450 A1 | 8/2007 | Croft et al. | |
| 2007/0232342 A1 | 10/2007 | Larocca | |
| 2007/0240160 A1 | 10/2007 | Paterson-Jones et al. | |
| 2007/0293169 A1 | 12/2007 | Maggio | |
| 2008/0104186 A1 | 5/2008 | Wieneke et al. | |
| 2008/0141232 A1 | 6/2008 | Gandolph et al. | |
| 2008/0178298 A1 | 7/2008 | Arai et al. | |
| 2008/0312948 A1 | 12/2008 | Kalliola | |
| 2008/0319841 A1 | 12/2008 | Oliver et al. | |
| 2009/0037566 A1 | 2/2009 | Hoile et al. | |
| 2009/0052648 A1 | 2/2009 | Lankes | |
| 2009/0078757 A1 | 3/2009 | Hanson et al. | |
| 2009/0103524 A1 | 4/2009 | Mantripragada et al. | |
| 2009/0222907 A1 | 9/2009 | Guichard | |
| 2010/0058446 A1 | 3/2010 | Thwaites | |

FOREIGN PATENT DOCUMENTS

| | | |
|---|---|---|
| EP | 1357454 A1 * | 10/2003 |
| WO | WO03077156 A1 | 9/2003 |
| WO | WO2004006059 A2 | 1/2004 |

OTHER PUBLICATIONS

Angelos Stavrou, John Ioannidis, Angelos D. Keromytis, Vishal Misra, and Dan Rubenstein; "A Pay-per-Use DoS Protection Mechanism For The Web"; Columbia University, 2004. pp. 1-15.*

Henderson, "Linux Loadable Kernel Module HOWTO", retrieved at <<http://www.ibiblio.org/pub/Linux/docs/HOWTO/other-formats/pdf/Module-HOWTO.pdf>>, Lauri Tischler, 1996, pp. 90.

Lerhaupt, et al., "Dynamic Kernel Module Support", retrieved at <<http://linux.dell.com/dkms/1q04-ler.pdf>>, Power Solutions, Mar. 2004, pp. 94-98.

"Managing and Developing Dynamically Loadable Kernel Modules", retrieved at <<http://docs.hp.com/en/dlkm-62001/dlkm-62001.pdf>>, Hewlett-Packard, Jun. 7, 2001, pp. 489-572.

PCT Search Report for Application No. PCT/US2007/013533, mail on Nov. 29, 2007, pp. 9.

* cited by examiner

BIOS BASED SECURE EXECUTION ENVIRONMENT

BACKGROUND

In traditional business models, users purchased computing devices and software for execution on the computing devices. Therefore, traditional computing devices were configured for "general purpose" execution of software desired by the user and not limited, by itself, to execution of particular software. For example, under this traditional business model the user may purchase a desktop personal computer (PC) having an operating system that permits execution of a wide range of applications, such as games, word processors, spreadsheets, and so on that may be obtained from a wide range of venders. Therefore, a provider of the desktop PC typically used a configuration that enabled the PC to execute as many of these different applications as possible, thereby increasing the functionality available to the user and consequently the desirability of the PC to the user.

To protect against piracy of software and other content, techniques were developed for Digital Rights Management (DRM). For example, DRM may be used to protect the rights of content owners and service providers from unauthorized access to content (e.g., a music file) and/or a service (e.g., a pay-per-view movie streamed over a network from a service provider). For example, DRM techniques may be used to combat unauthorized file sharing between users over a peer-to-peer network. Even though these traditional techniques may be successful in protecting the content, however these techniques were generally targeted at the content itself and not toward the computing device that executes the software. Therefore, even though the content itself may be protected, providers of computing devices (e.g., the desktop PC) were still limited to traditional business models to collect revenue from users.

SUMMARY

Techniques to provide a BIOS based secure execution environment are described. In an implementation, a method includes initiating a hardware interrupt by an embedded controller of a computing device. In response to the interrupt, a module is executed (that is stored in a basic input/output system (BIOS)) to determine whether to constrain functionality of the computing device based on a balance. By storing the module in the BIOS, the module is protected from access by the operating system and therefore may provide a secure environment, in which, to manage functionality of the computing device. For example, the functionality may be managed according to a subsidy/prepay model in which the computing device is limited to execution of software of a particular provider that subsidized the purchase of the computing device. A variety of other examples are also contemplated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional business models enabled a consumer to purchase a computing device (e.g., a desktop personal computer) that was configured to execute software that was also purchased by the consumer. Therefore, this traditional business model provided two streams of revenue, one to the manufacturer and seller of the computing device and another to a developer and seller of the software. Thus, traditional computing devices were configured for "general purpose" execution of software desired by the consumer and not limited, by itself, to execution of particular software beyond that which was specified by the software itself, e.g., digital rights management techniques for software.

Techniques are described, in which, a secure execution environment is created to "guarantee" execution of particular software. This particular software, for instance, may be configured to limit execution of other software by the computing device, thereby providing a basis for new business models with regard to computing devices. For example, the purchase of the computing device may be subsidized in order to obtain additional revenue from a purchaser of the computing device via other sources. The manufacturer, for instance, may use a "pay-per-use" model in which the manufacturer gains revenue through the sale of prepaid cards that enable use of the computing devices, such as a fee collected for use of the computing device for a predetermined amount of time.

In another instance, a software provider provides subscription-based use of software and therefore subsidizes the cost of providing the computing device. For example, the user may be limited to use of the computing device in conjunction with particular web services, access to which is gained by paying a fee. Therefore, the software provider may subsidize the cost of the computing device in order to obtain revenue from the user when accessing the services. A variety of other examples are also contemplated.

In the following discussion, an exemplary environment and devices are first described that are operable to perform techniques to provide a secure execution environment. Exemplary procedures are ten described that may be employed in the exemplary environment and/or implemented by the exemplary devices, as well as in other environments and/or devices.

Exemplary Environment

Figure 1:
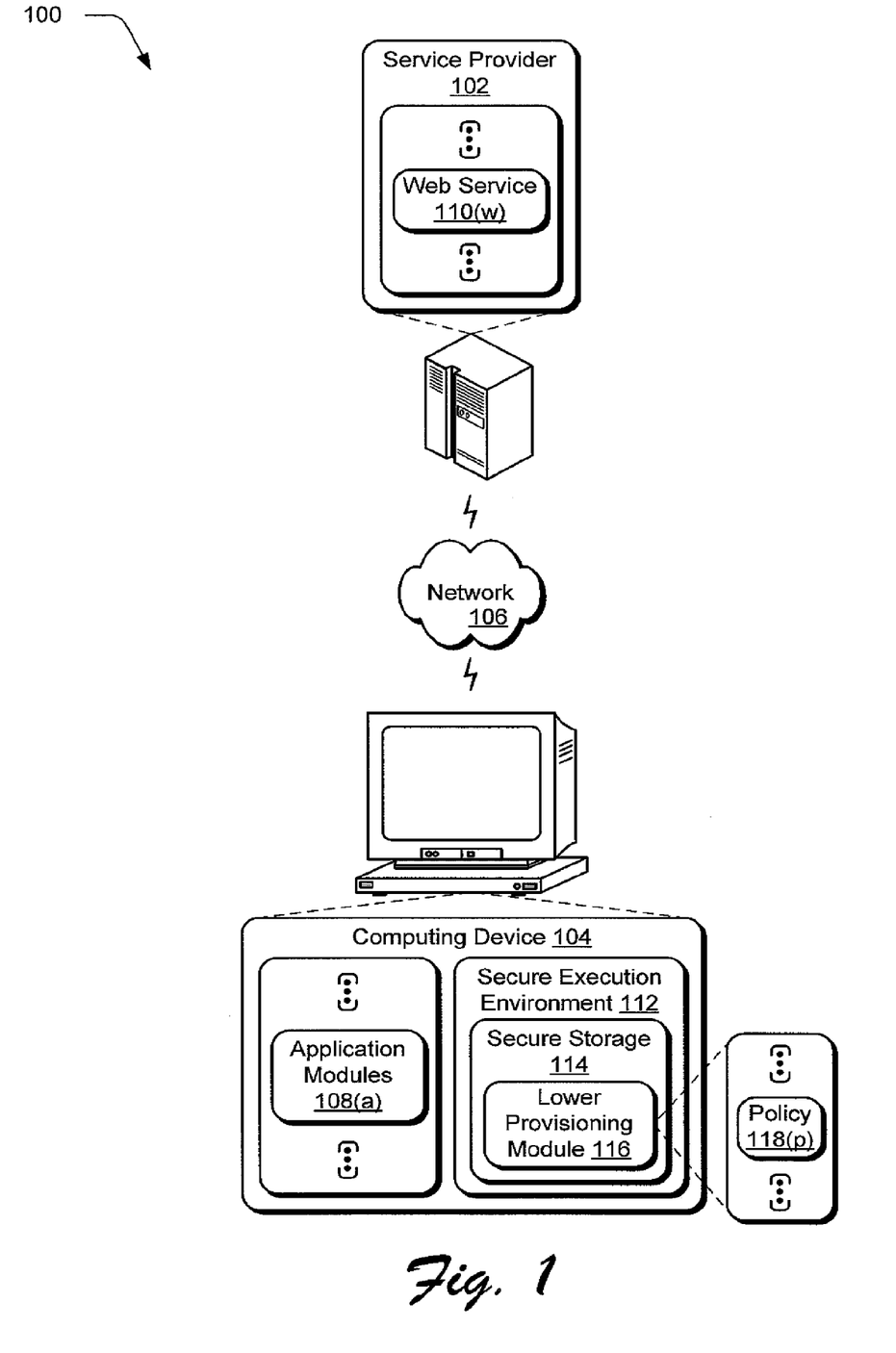
FIG. 1 is an illustration of an environment in an exemplary implementation that is operable to employ techniques to provide a secure execution environment.

FIG. 1 is an illustration of an environment 100 in an exemplary implementation that is operable to employ techniques that provide a secure execution environment. The illustrated environment 100 includes a service provider 102 and a computing device 104 that are communicatively coupled, one to another, via a network 106. In the following discussion, the service provider 102 may be representative of one or more entities, and therefore reference may be made to a single entity (e.g., the service provider 102) or multiple entities (e.g., the service providers 102, the plurality of service providers 102, and so on).

The computing device 104 may be configured in a variety of ways for network 106 access. For example, the computing devices 104 may be configured as a desktop computer, a mobile station, an entertainment appliance, a set-top box communicatively coupled to a display device, a wireless phone, a game console, and so forth. Thus, the computing device 104 may range from full resource device with substantial memory and processor resources (e.g., personal computers, game consoles) to low-resource device with limited memory and/or processing resources (e.g., traditional set-top box, hand-held game console).

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 104 is illustrated as having one or more application modules 108(a) (where "a" can be any integer from one to "A"). The application modules 108(a) may be configured in a variety of ways to provide a variety of functionality. For example, one of the application modules 108(a) may be configured as an operating system that provides a basis for execution of other ones of the applications modules 108(a). The other application modules 108(a), for instance, may be configured as productivity applications, such as word processors, spreadsheets, slideshow presentation applications, graphical design applications, note taking applications. The application modules 108(a) may also be configured as game, configured for network access (e.g., a browser), and so on. For instance, the application module 108(a), when executed, may interact with one or more web services 110(w) (where "w" can be any integer from one to "W") over the network 106.

As previously described, under traditional business models, computing devices were typically configured for "general purpose" usage to enable a user to access a wide range of application modules as desired. However, such "general purpose" configuration limited the computing device from taking advantage of other business models, in which, cost of the computing device was subsidized by another entity, such as a software provider, network access provider, web service provider, and so on. For instance, these other entities may collect revenue from use of the services and therefore subsidize the cost of the computing device to encourage users to use the services. In another example, a "pay-per-use" model may be used, in which, the initial cost of the computing device is subsidized and the user pays for use of the computing device in a variety of ways, such as a subscription fee, a fee paid for a set amount of time, a fee paid for use of a set amount of resources, and so on.

Therefore, the computing device 104 is configured to provide a secure execution environment 112 that may be used to control the functionality of the computing device 104. For example, the secure execution environment 112 may include secure storage 114 that maintains a lower provisioning module 116. The lower provisioning module 116 is representative of functionality to enforce one or more policies 118(p) (where "p" can be any integer from one to "P") that describe how functionality of the computing device 104 is to be controlled.

The policies 118(p) may be configured in a variety of ways. The policies, for instance, may be configured to support a "subsidy" business model to ensure that an entity that subsidized the computing device 104 will collect revenue from a user. In this instance, one of the policies 118(p) may control which application modules 108(a) are permitted to be executed on the computing device 104. Another one of the policies 118(p) may control which web services 110(w) may be consumed by the computing device 104. Therefore, the computing device 104, through enforcement of the policies 118(p) by the lower provisioning module 116 may be "targeted" toward use of functionality from particular entities that may charge for use of the functionality, e.g., the application modules 108(a) and/or the web services 110(w). In another instance, the policies 118(p) provide support for a "pay-per-use" business model, further discussion of which may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, e.g., memory 112(m), 114(n). The features of the techniques described below are platform-independent, meaning that the techniques may be implemented on a variety of commercial computing platforms having a variety of processors.

Figure 2:
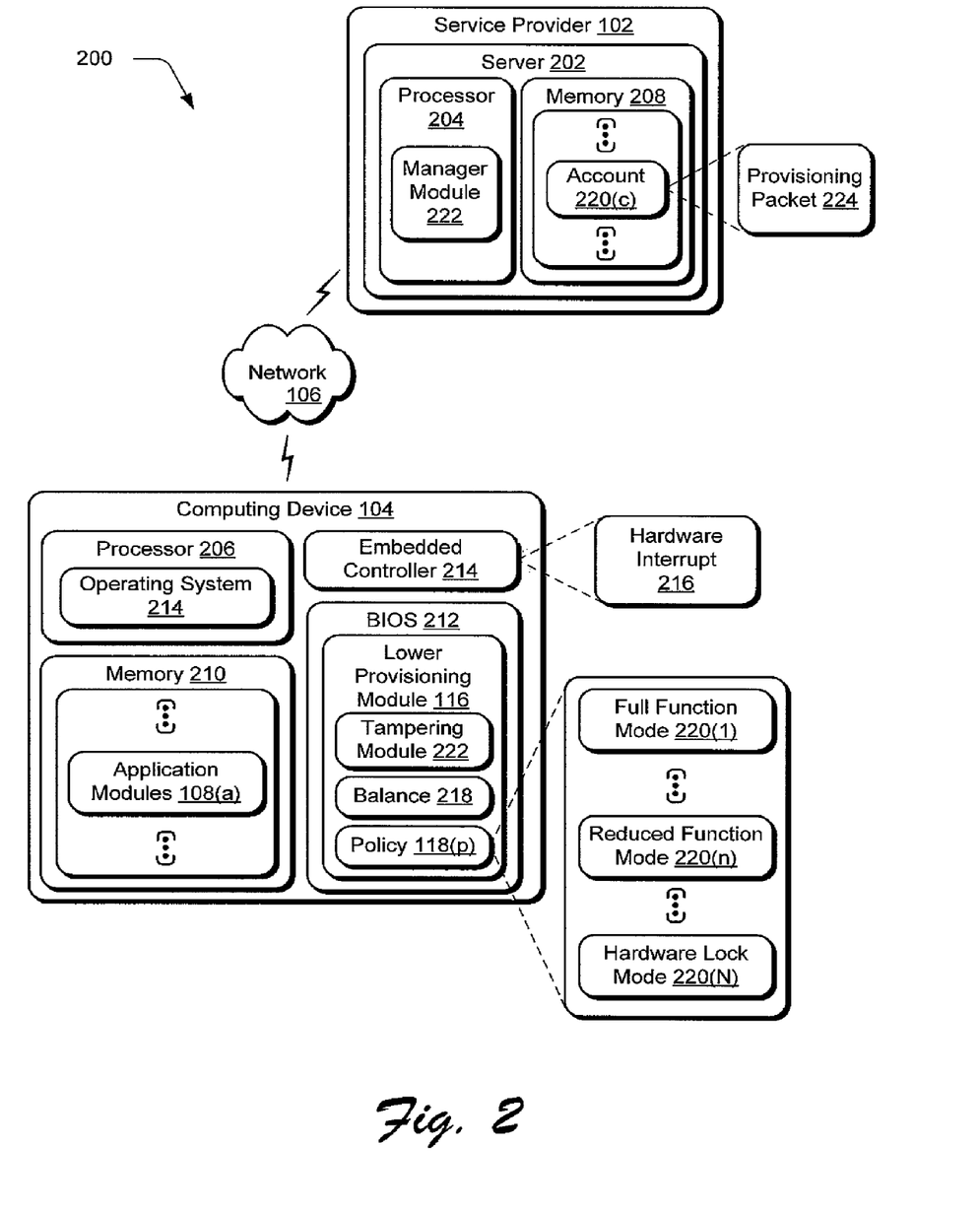
FIG. 2 is an illustration of a system in an exemplary implementation showing a service provider and a computing device of FIG. 1 as configured to implement a pay-per-use business model.

FIG. 2 is an illustration of a system 200 in an exemplary implementation showing the service provider 102 and the computing device 104 as configured to implement a pay-per-use business model. The service provider 102(m) is illustrated in FIG. 1 as being implemented by a server 202, which may be representative of more than one server, such as a server farm. The server 202 and the computing device 104 are each illustrated as having respective processors 204, 206 and memory 208, 210.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208, 210 is shown, respectively, for the server 202 and the computing device 104, a wide variety of types and combinations of memory may be employed, such as random access memory (RAM), hard disk memory, removable medium memory, and other types of computer-readable media.

The computing device 104 is also illustrated as having a basic input/output system (BIOS) 212. The BIOS 212 is typically stored in read-only memory (and thus may be considered as part of the memory 212) that, when executed, is responsible for basic control instructions and to "boot" the operating system 214 upon startup. The BIOS 212 is also illustrated as including the lower provisioning module 116, which as previously described is representative of functionality to enforce policies 118(p).

To ensure that the lower provisioning module 116 is executed, the computing device 104 further includes an embedded controller 214 that operates to output a hardware interrupt 216 to the processor 206. For example, the hardware interrupt 216 may be configured as a System Management Interrupt (SMI) that runs from a protected memory space (e.g., SMRAM), to which, the operating system 214 does not have access.

In response to the hardware interrupt 216, the lower provisioning module 116 is executed to enforce the policy 118 (p). In an implementation, the embedded controller 214 causes the hardware interrupt 216 at regular intervals (e.g., once per second) to ensure that the lower provisioning module 116 is executed at those regular intervals. The lower provisioning module 116 is also executable to meter usage of the computing device 104, such as to reduce usage time in a prepaid model.

In the illustrated implementation, the lower provisioning module 116 is executed to enforce a policy 118(p) that specifies a plurality of functional modes for the computing device 104, the enforcement of which is based on a balance 218 maintained locally on the computing device 104. For example, the plurality of functional modes may include a full function mode 220(l), in which, the computing device 104 is permitted to execute the application modules 108(a) using the full resources (e.g., processor 206, memory 210, network and software) of the computing device 104.

A reduced function mode 220(n) may also be provided, in which, the functionality of the computing device 104 is limited, such as by permitting limited execution of the application modules 108(a). For example, the reduced function mode 220(n) may prevent execution of the application modules 108(a) past a certain amount of time, thereby enabling a user to save and transfer data, but does not permit extended interaction with the application modules 108(a).

Further, a hardware lock mode 220(N) may also be specified, in which, execution of software other than BIOS and the lower provisioning module 116 is prevented. For example, the hardware lock mode 220(N) may prevent execution of the operating system 214 on the processor 206 altogether, and consequently the execution of the application modules 108(a) that use the operating system 214 to use resources of the computing device 104.

Each of these different operational modes (e.g., the full function mode 220(l), reduced function mode 220(n) and hardware lock mode 220(N)) may be entered depending on the balance 218. Therefore, adjustment of the balance 218 may cause entry into the different modes and therefore be used to control the functionality of the computing device. The balance 218, for instance, may support a "pay-per-use" business model, in which, the balance 218 is decremented at periodic intervals. For instance, the lower provisioning module 116 may be executed at periodic intervals due to periodic output of a hardware interrupt 216 by the embedded controller 214. Therefore, the lower provisioning module 116 may also decrement the balance 216 when executed during these periodic intervals and thus "lower" the balance as the computing device 104 is being used.

To "raise" the balance, the computing device 104 may be associated with a particular account 220(c) maintained by a manager module 22 of a service provider 102. For example, the manager module 22 may cause a provisioning packet 224 to be communicated over the network 106 to the computing device 104, such as in response to an input received from a human operator of the service provider 102 (e.g., customer support personnel), automatically and with user intervention through interaction with the lower provisioning module 116 (e.g., communication of an identifier which is used to retrieve billing information from the account 220(c)), and so on. The provisioning packet 224, when received by the lower provisioning module 116, may be used to "raise" the balance 218 and therefore regain/maintain access to the functionality of the computing device 104.

The lower provisioning module 116 is further illustrated as including a tampering module 222 which is representative of functionality to detect and counter attempts to tamper with the lower provisioning module 116. For example, the tampering module 222, when executed, may detect attempts to tamper with the balance 218, a clock on the computing device 104 to "extend" the balance, and so on. In response to these attempts, the tampering module 222 may place the computing device in the hardware lock mode 220(N) to prevent further tampering. Additionally, the tampering module 222 may output an identification code which is to be used by the user to remove the hardware lock mode 220(N). This identification, however, may indicate to customer support personnel that tampering was attempted and therefore appropriate action may be taken, such as declining to restore the balance, charge a tampering fee, and so on. Further discussion of the execution of the tampering module 222 may be found in relation to FIG. 5.

Exemplary Procedures

The following discussion describes secure execution environment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
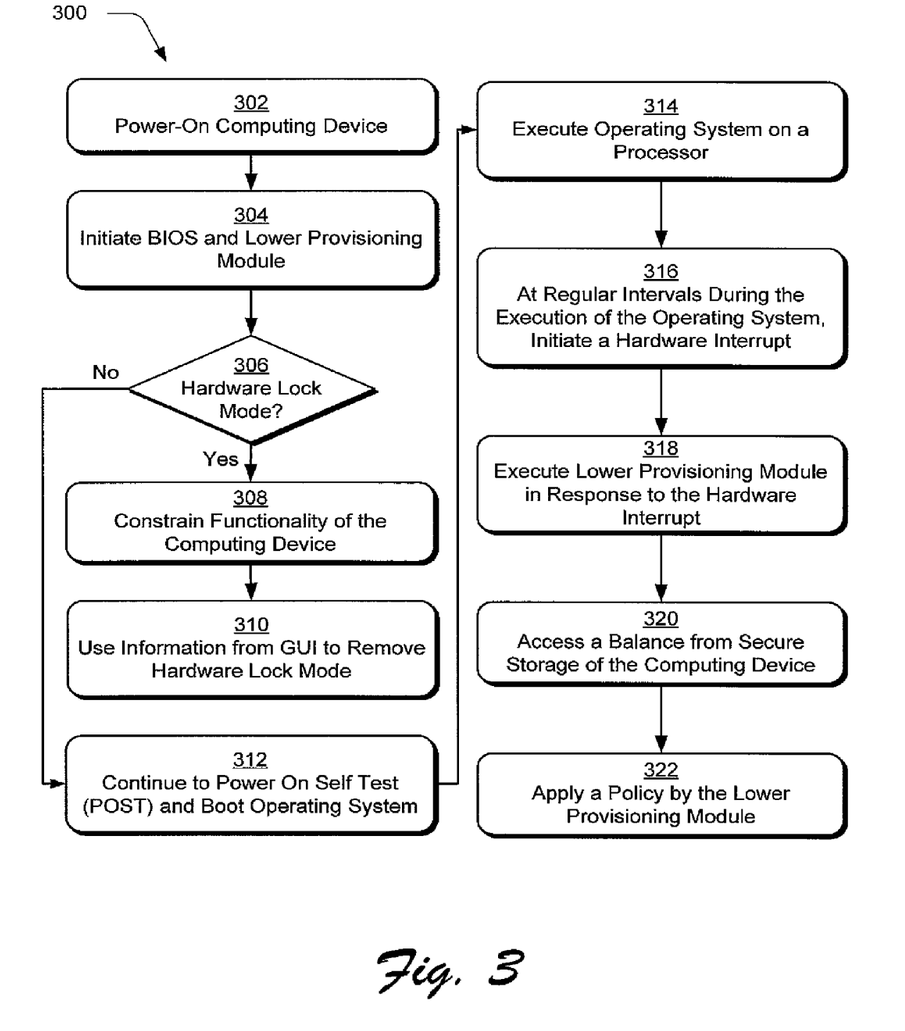
FIG. 3 is a flow diagram depicting a procedure in an exemplary implementation in which a policy is initiated to manage functionality of a computing device.

FIG. 3 depicts a procedure 300 in an exemplary implementation in which a computing device is initiated and a lower provisioning module is executed to apply a policy to manage functionality of a computing device. A computing device is powered on (block 302), such as in response to a user pressing a power-on button.

In response to the "power on" input, a BIOS and a lower provisioning module are initiated (block 304). For example, when the BIOS is read from a read-only memory, a lower provisioning module may also be read and executed.

A determination is then made as to whether the computing device is to be placed in a hardware lock mode (decision block 306). The lower provisioning module, for instance, may determine whether the balance 218 is depleted, if tampering has been detected, and so on.

When the computing device is to be placed in the hardware lock mode ("yes" from decision block 306), functionality of the computing device is constrained (block 308). A hardware lock mode graphical user interface (GUI) is also output. For instance, while in the hardware lock module 220(N), the user may be prevented from executing other modules besides the lower provisioning module on the computing device 104, including an operating system. Further, the lower provisioning module may output a GUI that describes how the user may "remove" the hardware lock mode.

The GUI, for example, may include a telephone number of customer service personnel, an identifier particular to the computing device 104, and an encrypted identifier describing "why" the hardware lock mode was entered. The user may then use this information from the GUI to remove the hardware lock mode (block 310), such as to contact a service provider to update the balance 218, reset the computing device 104 from tampering, and so forth, further discussion of which may be found in relation to FIGS. 4 and 5.

When the computing device is not to be placed in the hardware lock mode ("no" from decision block 306), the computing device continues to a power on self test (POST) and a boot of the operating system (block 312). Thus, as previously described the operating system, as well as application modules that are executed "on top" of the operating system, are permitted to execute when the computing device 104 is not in the hardware lock mode 220(N).

The operating system is executed on the processor (block 314). At regular intervals during the execution of the operating system, a hardware interrupt is initiated (block 316). For example, an embedded controller 214 may be configured to initiate the hardware interrupt 216 when a predetermined amount of time has passed. In another example, the hardware interrupt 216 may be initiated by software executed on the processor 206. A variety of other examples are also contemplated.

The lower provisioning module is executed in response to the hardware interrupt (block 318). Thus, by providing the hardware interrupt at regular intervals, execution of the lower provisioning module is also performed at regular intervals.

The lower provisioning module, when executed, accesses a balance from secure storage of the computing device (block 320). The balance 218, for instance, may be maintained within system management random access memory (SM-RAM) that is accessible by BIOS 212 and the lower provisioning module 116 but not by other application modules, such as the operating system 214. The lower provisioning module 116 may then apply a policy 118(p) (block 322) to manage functionality of the computing device 104 based on the balance 218, further discussion of which may be found in relation to the following figure.

Figure 4:
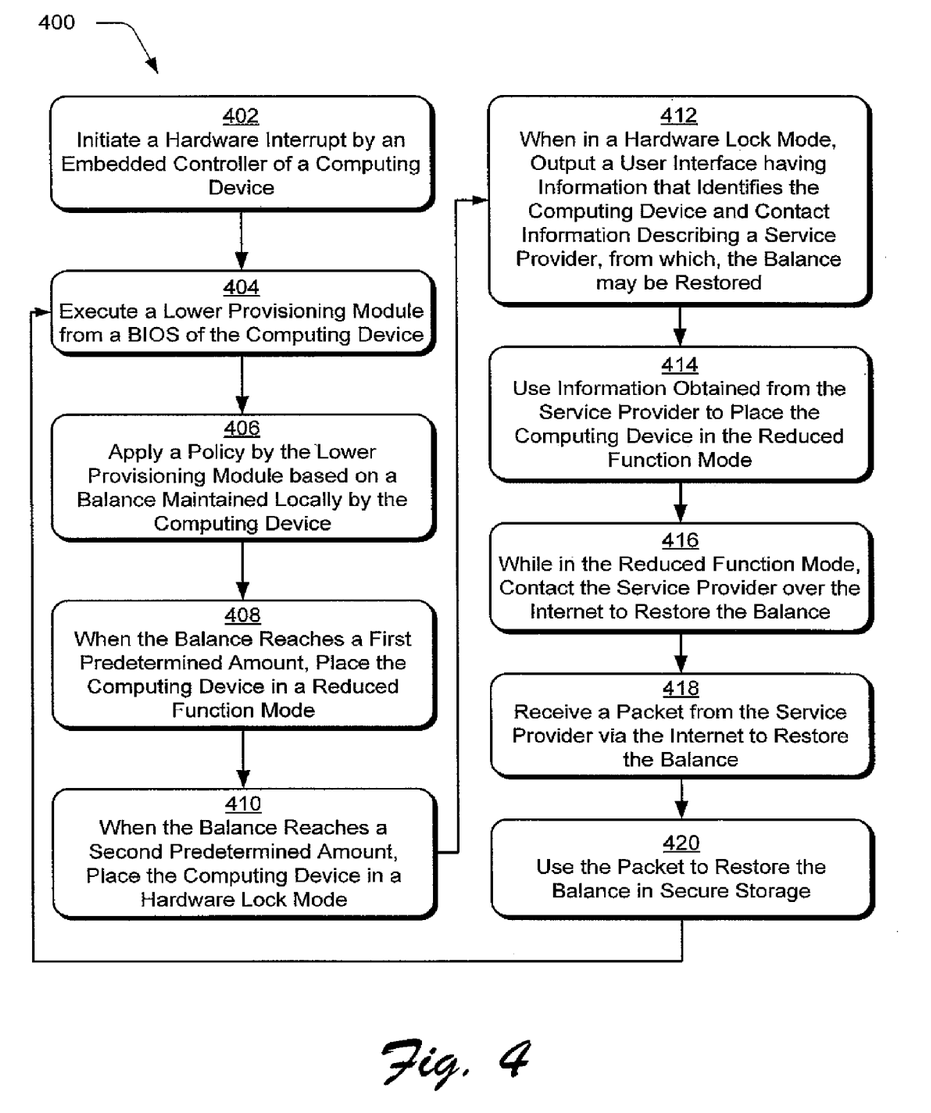
FIG. 4 is a flow diagram depicting a procedure in an exemplary implementation in which the policy of FIG. 3 is applied to manage functionality of a computing device based on a balance maintained locally on the computing device.

FIG. 4 depicts a procedure 400 in an exemplary implementation in which a policy is applied to manage functionality of a computing device based on a balance maintained locally on the computing device. A hardware interrupt is initiated by an embedded controller of a computing device (block 402), which causes a lower provisioning module to be executed from a BIOS of the computing device (block 404).

A policy is applied by the lower provisioning module that is based on a balance maintained locally by the computing device (block 406). For example, when the balance reaches a first predetermined amount, the computing device is placed in a reduced function mode (block 408). The reduced function mode 220(n), for instance, may specify that application modules 108(a) are permitted to execute for a limited amount of time, specify changed graphics to indicate to a user that the reduced function mode 220(n) has been entered, and so on. Thus, in the reduced function mode, the user is given the opportunity to save and move data as well as "refresh" the balance, further discussion of which may be found below.

When the balance reaches a second predetermined amount, the computing device is placed in a hardware lock mode (block 410). The lower provisioning module, for instance, may be executed at regular intervals, during which, it determines a current state of the balance 218 that is automatically decremented as tine passes, e.g., as the computing device 104 is executed. When the balance reach the second predetermined amount (e.g., is "depleted"), the computing device 104 is placed in a hardware lock mode, in which, a user interface is output having information that identifies the computing device and contact information describing a service provider, from which, the balance may be restored (block 412). The user, for instance, may call a telephone number listed in the user interface and enter the encrypted identifier in the user interface, to remove the hardware lock mode. In this instance, the user may also supply billing information to refresh the balance 218 of the computing device 104, such as to purchase additional "points" which are decremented as the computing device 104 operates.

The user, for instance, may obtain information from the service provider to place the computing device "back" into the reduced function mode 220(n) (block 414). While in the reduced function mode, contact may be made with the service provider over the Internet to restore the balance (block 416), such as through communication of the lower provisioning module 116 with the manager module 222 over the network 106. From this contact, the computing device may receive a packet from the service provider via the Internet (block 418), which is used by the lower provisioning module 116 to restore the balance 218 (block 420) that is maintained in secure storage. Thus, in this example, the policy 118(p) specifies entry of different functional "modes" based on the balance 218 that is maintained locally on the computing device 104. In another example, the lower provisioning module restores the computing device to a metering mode, such as in response to detection of tampering. Thus, the policy 118(p) may be configured to describe a variety of other scenarios, an example of which may be found in relation to the following figure.

Figure 5:
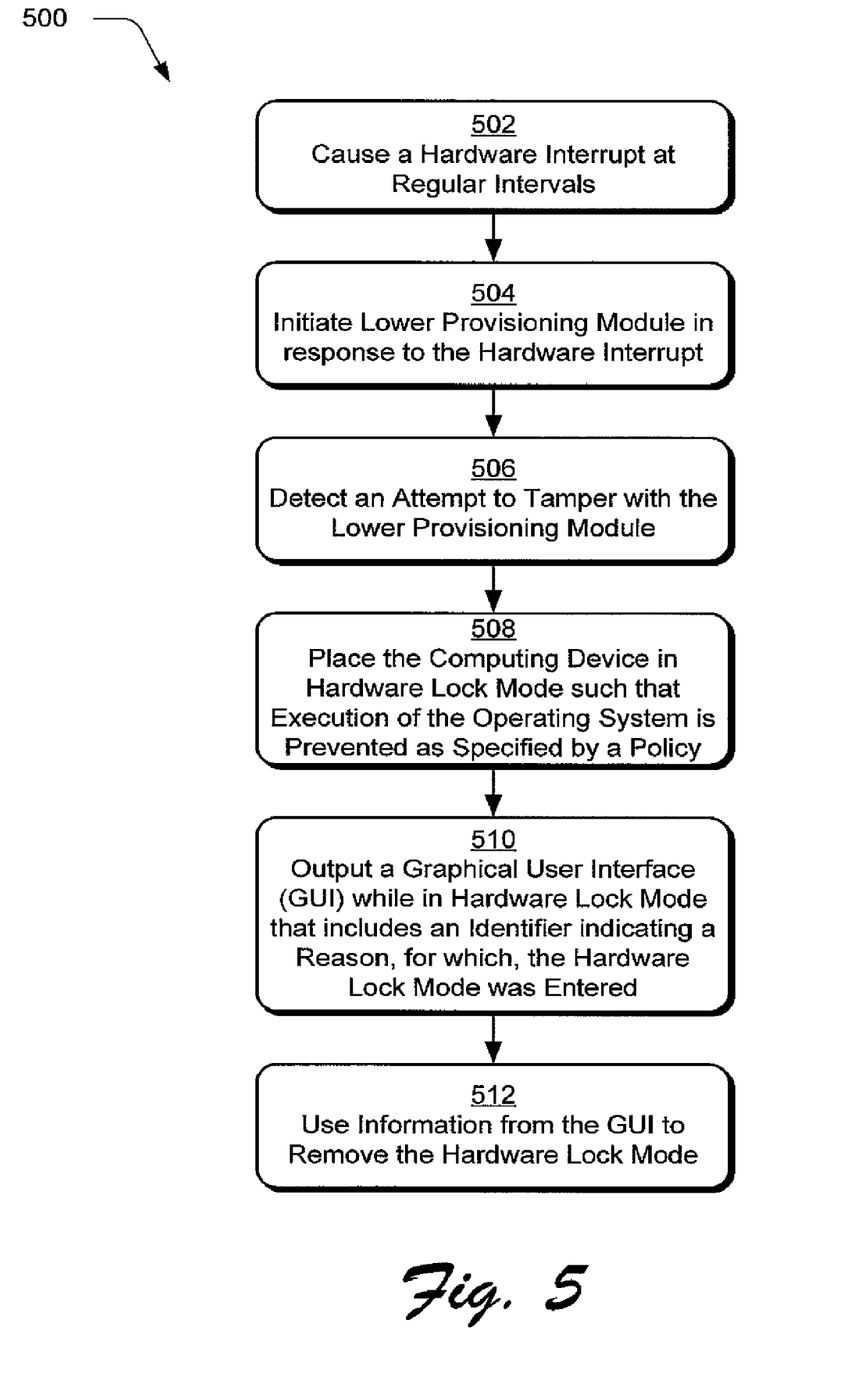
FIG. 5 is a flow diagram depicting a procedure in an exemplary implementation in which a policy is directed to counter tampering with a lower provisioning module that implements the policy.

FIG. 5 depicts a procedure 500 in an exemplary implementation in which a policy is directed to counter tampering with the lower provisioning module. As before, a hardware interrupt is caused at regular intervals (block 502) to initiate execution of a lower provisioning module (block 504).

An attempt to tamper with the lower provisioning module is detected (block 506). For example, the lower provisioning module may detect an attempt to modify the balance 218 without receiving a provisioning packet 224, an attempt to tamper with a clock that "counts down" the balance 218, an attempt to disable the lower provisioning module 218 itself and so on.

In response to the attempt, the computing device is placed in a hardware lock mode such that execution of the operating system is prevented as specified by a policy (block 508). Additionally, while in the hardware lock mode, a graphical user interface (GUI) is output that includes an identifier indicating a reason, for which, the hardware lock mode was entered (block 510). In an implementation, the purpose of the identifier is not readily apparent to a user, e.g., the identifier may be a list of characters that are nonsensical to the user. In another implementation, however, the identifier may so indicate the reason and/or the reason may be indicated in another way, such as a graphical warning.

The information in the GUI is then used to remove a hardware lock mode (block 512). For instance, the user may call the service provider and recite the identifier and a unique identifier of the computing device 104 to customer support personnel. In this way, the service provider may track the tampering attempts and react accordingly, such as through refusal to "release" the computing device from hardware lock mode 220(N) after more than one such tampering attempt has been detected, charge a special fee to unlock the computing device, and so on. Although the policy in this instance was directed toward tampering, the policy may describe a variety of other scenarios, such as functionality to be provided in the reduced function mode 220(*n*), permissible application modules 108(*a*) to be executed on the computing device 104, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   initiating a hardware interrupt, at regular intervals, by an embedded controller of a computing device;
   in response to the interrupt, executing a lower provisioning module at the regular intervals, the lower provisioning module stored in a basic input/output system (BIOS), the lower provisioning module configured to enforce one or more policies that describe how a functionality of the computing device is controlled, the lower provisioning module further configured to:
   determine whether to constrain functionality of the computing device based on a balance stored in the BIOS, the balance comprises an amount of time the computing device is available to a user, wherein an adjustment to the balance results in the computing device entering one or more operating modes comprising:
      a full function mode enabling the computing device to execute one or more application modules using full resources of the computing device,
      a reduced function mode permitting limited execution of the one or more application modules, or
      a hardware lock mode preventing execution of the operating system;
   detect and counter, using a tampering module, attempts to tamper with the balance stored in the BIOS;
   in response to the attempts to tamper with the balance, output, using the tampering module, an identification code to remove the hardware lock mode; and
   receiving at the lower provisioning module a provisioning packet to regain access to a functionality of the computing device.

2. A method as described in claim 1, wherein the the operating system is executable by a processor that is separate from the embedded controller.

3. A method as described in claim 1, wherein the lower provisioning module is executed in a secure execution environment that is not accessible by the operating system.

4. A method as described in claim 1, wherein the balance is stored in the lower provisioning module of the BIOS.

5. A method as described in claim 1, wherein when the computing device is placed in the hardware lock mode, the lower provisioning module causes output of a user interface that describes information that is usable, at least in part, to remove the hardware lock mode and an identifier particular to the computing device.

6. A computer-implemented method comprising:
   receiving by a computing device a hardware interrupt at regular intervals;
   applying, by the computing device, a policy to manage functionality of the computing device at the regular intervals based on a balance stored in a basic input/output system (BIOS) of the computing device that indicates an amount of time that one or more services of the computing device are available to a user, wherein the balance is maintained locally by the computing device, wherein the policy specifies that when the balance reaches a first amount, a lower provisioning module reduces the functionality of the computing device, and when the balance reaches a second amount, the lower provisioning module further reduces the functionality of the computing device such that execution of an operating system by the computing device is prevented;
   the computing device entering into a hardware lock mode in response to detection, by a tampering module of the computing device, of attempts to tamper with the lower provisioning module, wherein the attempts to tamper comprise an unauthorized attempt to increase the balance stored in the BIOS; and
   outputting, by the computing device in response to the detection, an identification code usable to remove the hardware lock mode.

7. A computer-implemented method as described in claim 6, wherein the hardware interrupt is caused by an embedded controller of the computing device that is separate from a processor of the computing device that is configured to execute the operating system.

8. A computer-implemented method as described in claim 6, wherein the hardware interrupt is caused by software that is executable by an embedded controller.

9. A computer-implemented method as described in claim 6, wherein the policy is maintained in secure storage that is inaccessible by the operating system.

10. A computer-implemented method as described in claim 9, wherein the secure storage is part of the BIOS.

11. A computer-implemented method as described in claim 6, wherein the reduced functionality specified when the balance reaches the first amount:
    permits execution of the operating system; and
    limits execution of one or more application modules in conjunction with the operating system.

12. A computer-implemented method as described in claim 6, further comprising outputting, by the computing device in response to the detection, a user interface having information that indicates that the hardware lock mode was entered due to the detection of tampering.

13. The computer-implemented method as described in claim 6, wherein the policy specifies that when the balance reaches the first amount:
    the operation system is authorized to transfer data; and
    one or more application modules of the operating system are not executable.

14. A computing device, comprising:
    a processor;
    a basic input/output system (BIOS) configured to maintain a module and a balance, wherein the balance comprises an amount of time the computing device is available to a user;
    an embedded controller configured to cause a hardware interrupt of the processor to apply a policy, through execution of the module from the BIOS, to manage functionality of the computing device based on the balance, wherein the policy specifies that:
       the module reduces a functionality of the computing device in response to the balance reaching a first amount; and
       the module further reduces the functionality of the computing device to prevent execution of an operating system in response to the balance reaching a second amount,
    wherein the balance is adjustable through interaction with another computing device over a network through payment of a fee, the interaction comprising receiving a provisioning packet over the network from the other computing device; and a tamper module configured to detect and counter attempts to tamper with an amount of the balance maintained on the BIOS.

15. A computing device as described in claim 14, wherein the embedded controller is configured to initiate the hardware interrupt at predetermined intervals.

* * * * *